May 5, 1936. R. E. ADAMS 2,039,509
ELECTRIC BRAKE MECHANISM FOR AUTO TRUCKS AND TRAILERS
Filed April 8, 1933 5 Sheets-Sheet 1
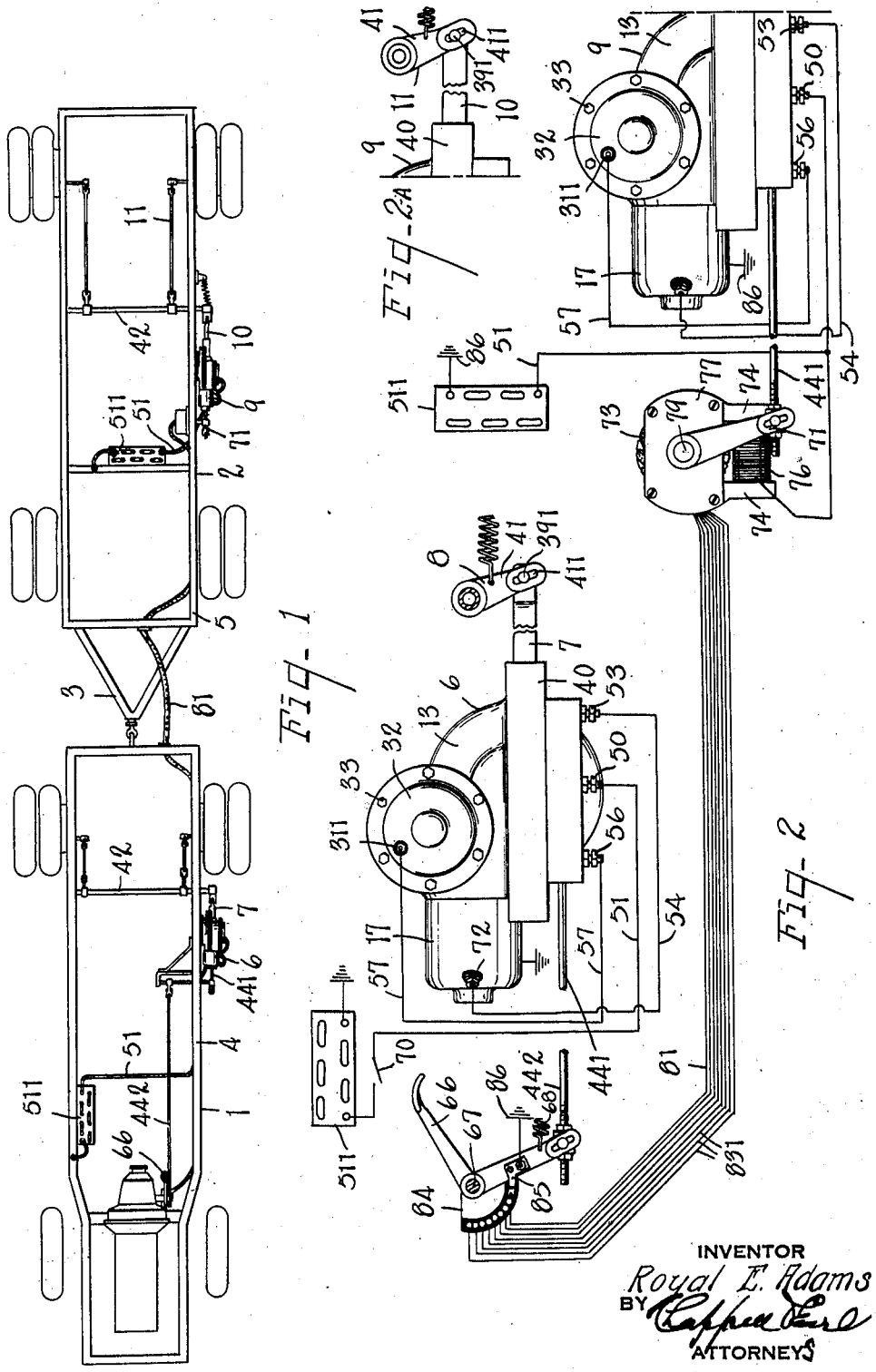
INVENTOR
Royal E. Adams
BY
ATTORNEYS May 5, 1936.  R. E. ADAMS  2,039,509
ELECTRIC BRAKE MECHANISM FOR AUTO TRUCKS AND TRAILERS
Filed April 8, 1933  5 Sheets-Sheet 2
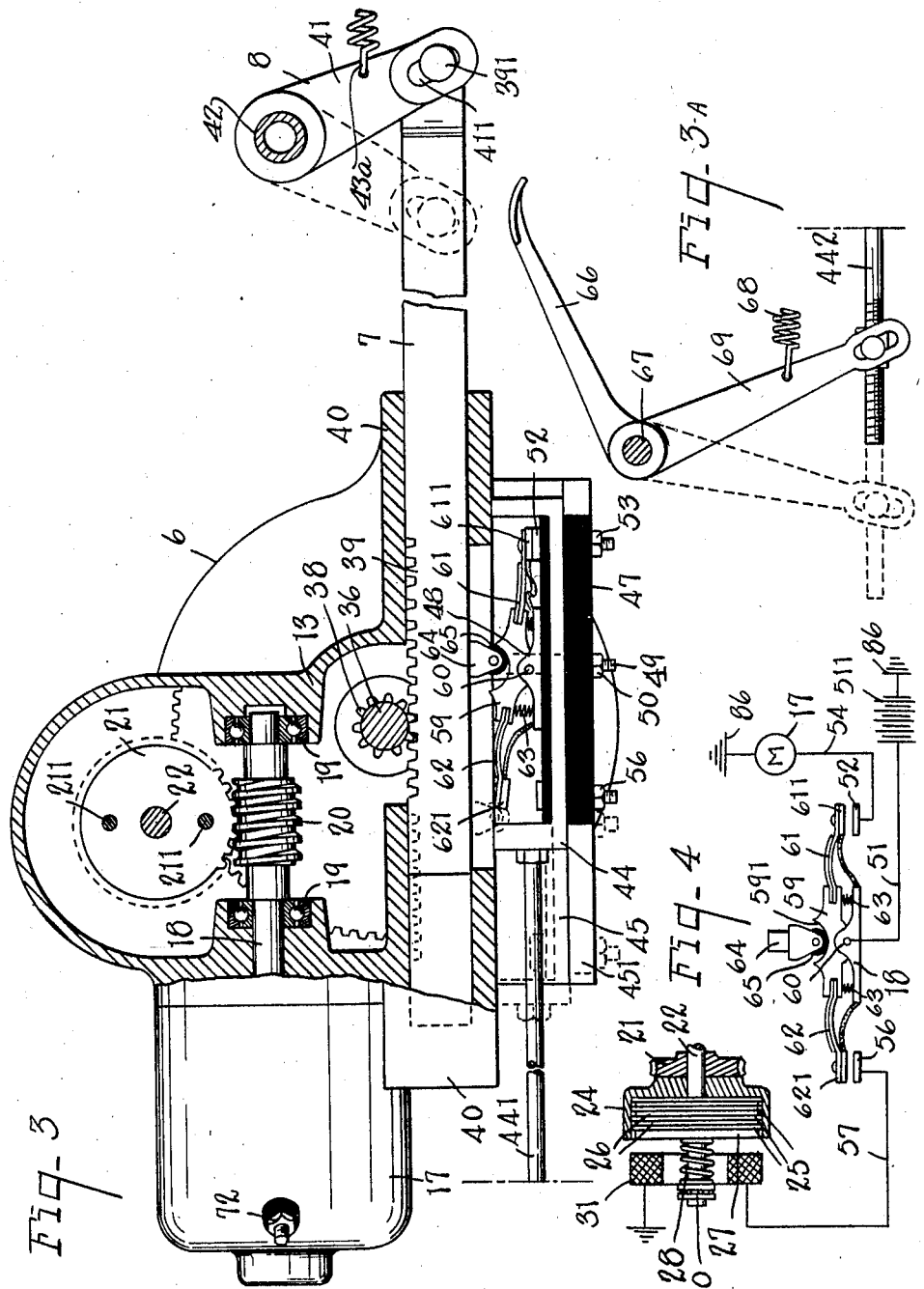
INVENTOR
Royal E. Adams
BY
ATTORNEYS

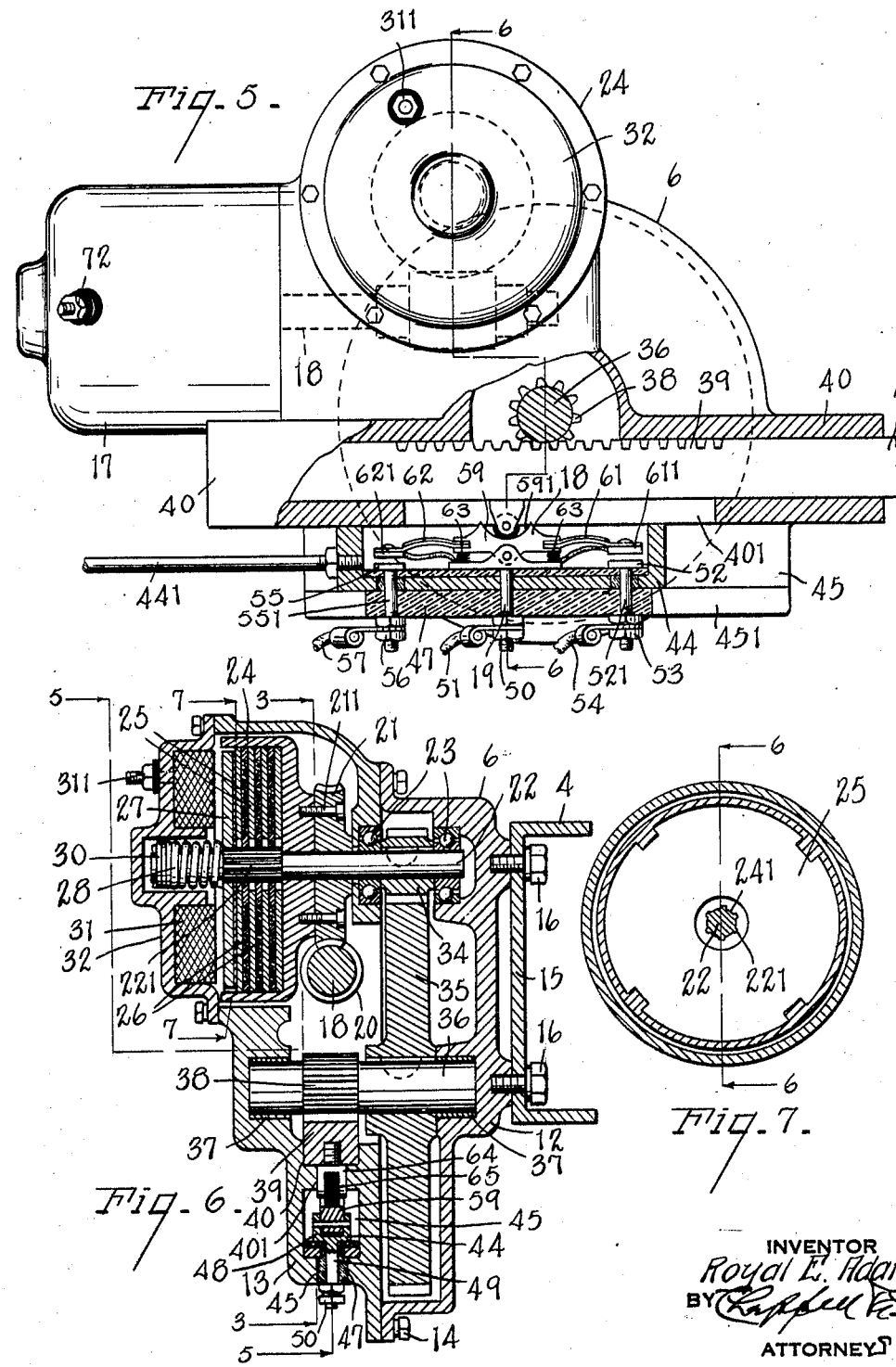

May 5, 1936.  R. E. ADAMS  2,039,509
ELECTRIC BRAKE MECHANISM FOR AUTO TRUCKS AND TRAILERS
Filed April 8, 1933   5 Sheets-Sheet 4
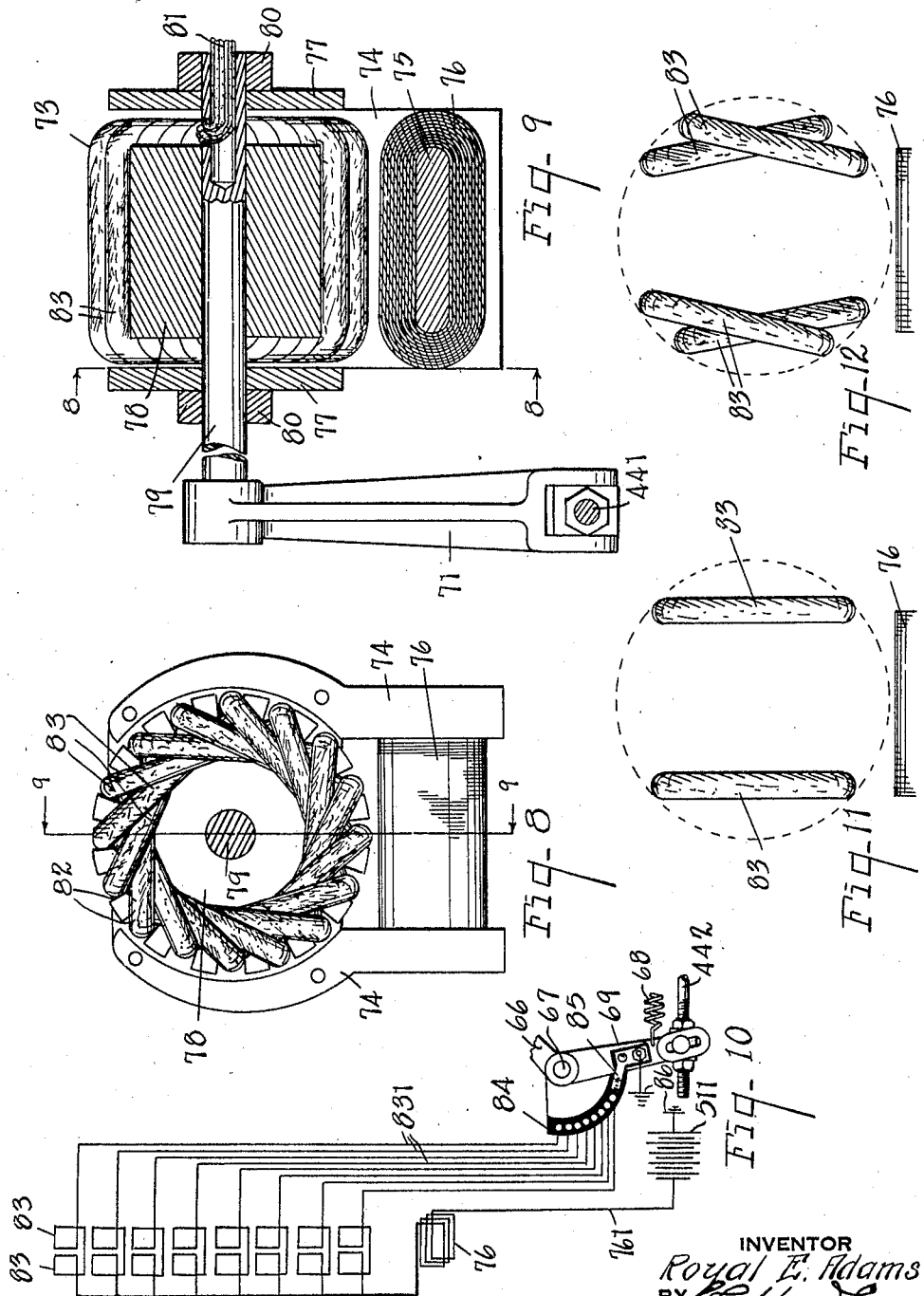
INVENTOR
Royal E. Adams
BY
ATTORNEYS

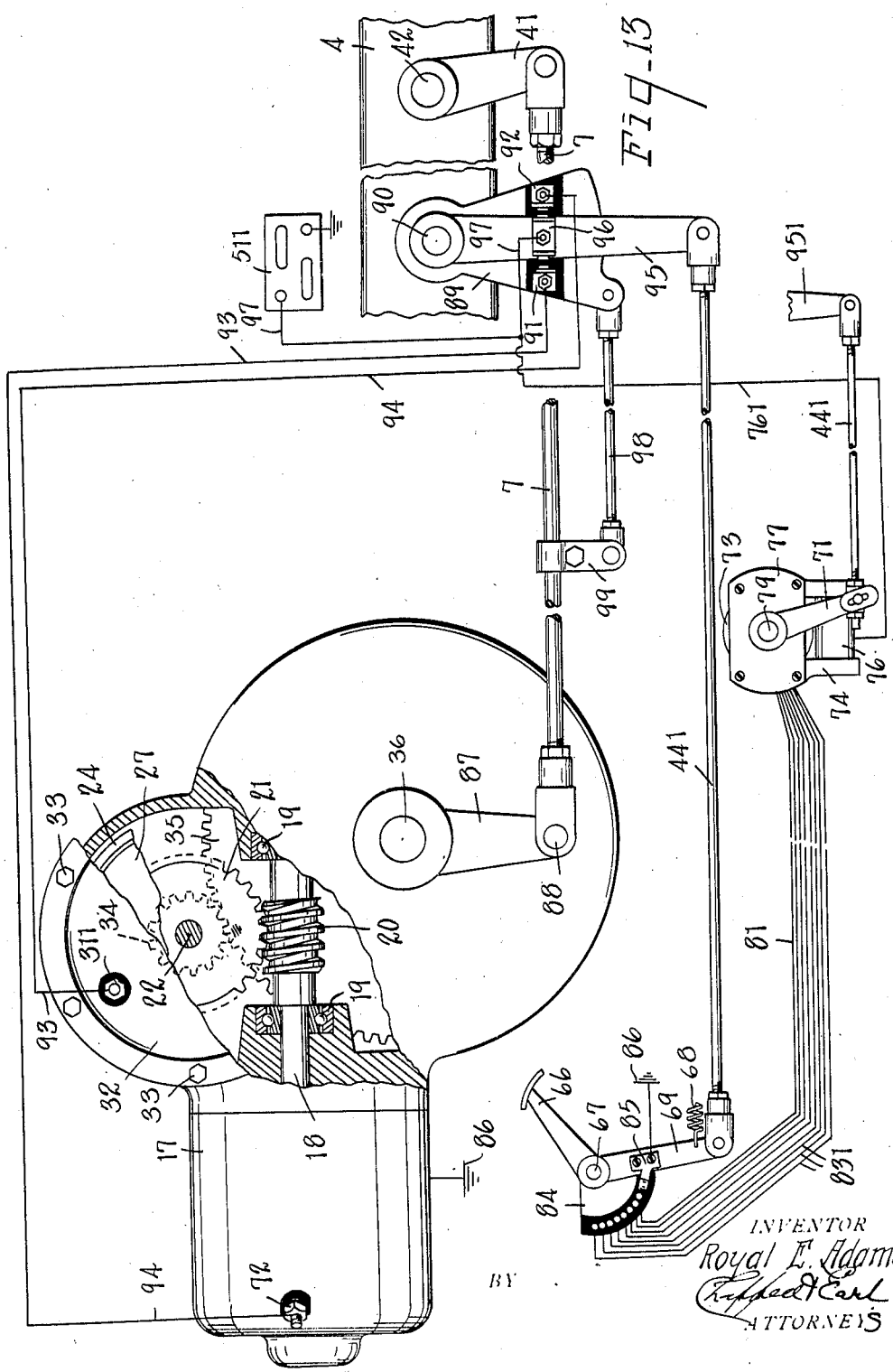

Patented May 5, 1936

2,039,509

UNITED STATES PATENT OFFICE 2,039,509

ELECTRIC BRAKE MECHANISM FOR AUTO TRUCKS AND TRAILERS

Royal E. Adams, Los Angeles, Calif., assignor to Edwin Pederson, Los Angeles, Calif., as trustee Application April 8, 1933, Serial No. 665,189

9 Claims. (Cl. 188—3)

The objects of the invention are:

First, to provide improvements in electric brakes and electric controls therefor with distant control means whereby for instance an operator on a freight truck will be able to operate and control the brake on the trailer that is being hauled by the truck.

Second, to provide improved electric control means for electric brake motors or similar motors operable at a distance.

Third, to provide in such a structure improved position controlled electric motor means.

Fourth, to provide an improved position controlled motor.

Fifth, to provide an improved construction of electric power unit for such a brake or similar purpose.

Objects pertaining to details and economies of construction and operation will appear from the description to follow.

Preferred embodiments of my invention are illustrated in the accompanying drawings, in which:

Fig. 1 is a diagrammatic plan view of a motor truck and connected trailer with my improved brake mechanism in place.

Figs. 2-2A is an enlarged detail elevation view of one of the electric units of my improved brake mechanism and control mechanism for truck and trailer with the wiring therefor indicated partially in diagram, the connections and wiring both being shown conventionally and in broken section.

Figs. 3-3A is an enlarged detail elevation partially in vertical central section on the plane of irregular line 3—3 of Fig. 6 through the forward electric brake, gear connections, and switch with the control pedal and connection being shown in full lines.

Fig. 4 is a detail sectional view of the magnetic clutch taken on line 6—6 of Figs. 5 and 7 and showing the wiring diagram in connection therewith.

Fig. 5 is an enlarged detail elevation partially in vertical longitudinal section on the line corresponding to line 5—5 of Fig. 6 with parts broken away, showing the rack and pinion and switch means in section.

Fig. 6 is an enlarged detail transverse sectional elevation view through one of my electric power units taken on the irregular plane of line 6—6 of Figs. 5 and 7.

Fig. 7 is a detail sectional view of the disk clutch on line 7—7 of Fig. 6.

Fig. 8 is an enlarged detail elevation view of the position controlled motor with the cover removed, taken in section on line 8—8 of Fig. 9.

Fig. 9 is an enlarged detail longitudinal sectional view through the said position controlled motor on line 9—9 of Fig. 8.

Fig. 10 is a detail view of the lever switch control means and the wiring diagram of the said position controlled motor.

Fig. 11 is an enlarged detail view showing the disposition and arrangement of a single pair of the coils and field in the position controlled motor.

Fig. 12 is a similar elevation view to Fig. 11, showing the relative position of two succeeding pairs of such coils.

Fig. 13 is a detail elevation view partially diagrammatic of a modification of my invention, showing a modified form of brake motor and of the electric switch control.

The parts will be identified by their numerals of reference which are the same in all the views.

1 is the front truck shown in diagram. 2 is the trailer. 3 is the connection between the truck and the trailer. 4 is the frame of the truck and 5 is the frame of the trailer.

I provide an electric unit 6 carried by frame 4 of the truck provided with a draw bar rack 7 connected to the brake mechanism 8 and a substantially identical electric unit 9 carried by the frame 5 of the trailer provided with a rack draw bar 10 connected to the rear brake mechanism 11. The units 6 and 9 and their actuating parts are substantially identical and are controlled electrically in substantially the same manner as the electric control means for brake of my Patent 1,903,801, issued April 18, 1933. Each motor unit 6 and 9 is made up of identical parts and are the same as those appearing in said patent.

12 and 13 are the parts of the frame or casing which are connected together by screws or bolts 14 (see Fig. 6). 15 is the side rail of the frame to which the casing is attached by cap screws 16, 16. 17 is an electric motor. 18 is the motor shaft supported in suitable bearings 19, 19 in the frame section 13, (see Fig. 3). 20 is a worm carried by the shaft 18. 21 is the worm gear coacting with the said worm 20 and free to revolve upon its supporting shaft 22. 23, 23 are ball bearings or other anti-friction thrust bearings in the frame parts 12 and 13 supporting the shaft 22.

A disk clutch housing 24 is secured rigidly to worm gear 21 by screws 211. The disk housing 24 is provided with inwardly projecting splines 241 and shaft 22 is provided with splines 221 where it extends within the clutch housing (see Figs. 6 and 7). Clutch disks 25 are splined to engage the housing 24 and alternate with clutch disks 26 which are splined to engage the splines 221 on the shaft 22. 27 is a disk armature embracing the said clutch disks and forced yieldably against them by the coil spring 28 under the anti-friction collar 30 at the end of the shaft 22. The said spring 28 holds the said clutch disks yieldingly in engagement when the clutch is thrown in. One set of the disks (preferably disks 26) may be provided with the usual cork inserts to insure the best action.

31 is an electromagnetic coil retained within the cap 32 which is secured to the casing member 13 by cap screws 33 and disposed to pull disk armature 27 to release the clutch. Binding post 311 is provided for the magnet connection 57 hereafter to be described.

34 is a pinion keyed to shaft 22 between the bearings 23, 23 and meshes with the driven gear 35 which is keyed to the shaft 36. Shaft 36 is carried in bearings 37, 37 in the said casing parts 12, 13. 38 is a pinion keyed or otherwise secured to shaft 36.

Pinion 38 meshes with the reciprocating rack 39 which is supported in suitable way 40 in the casing part 13, (see Fig. 3). A longitudinal slot 401 is in the bottom of the way 40. The projecting end of rack 39 is connected to the brake shaft arm 41 by pin 391 in slot 411 and serves to rock the brake rockshaft 42, as seen in Figs. 1 and 3, and thereby apply the brake. The brake is released by the usual spring 43A (see Fig. 3).

44 is a slide in way 45 directly below and parallel with the way 40. The way 45 is provided with a longitudinal slot 451 in the bottom in which is disposed a reciprocating insulator bar 47 carried by the slide 44. 48 is a switch member provided with a downwardly projecting shank 49 carrying a binding post 50 to which is connected the conductor 51 from the storage battery 511, or other source of current. 52 is a switch contact member provided with a shank 521 and binding post 53 at its lower end connecting to conductor 54 leading to the motor binding post 72. At the opposite end is the switch contact 55 provided with shank 551 having a binding post 56 with a conductor 57 leading to the electromagnetic binding post 311.

The switch rocker 59 is pivoted at 60 on the member 48 and is provided with an arm 61 having a contact 611 to cooperate with the contact member 52 to control the current to the motor. An opposite arm 62 is provided with a contact 621 cooperating with the contact 55 to deliver current to the magnet.

Compression balancing springs 63, 63 are under the rocker. The rocker 59 is provided with a central depression 591. On the under side of the rack 39 is a depending arm 64 carrying an insulation roller 65 which extends into the depression 591 in the rocker member 59 and cooperates therewith to control the current by the movement of the same, timed and actuated to control the power applied to the brake.

The slide 44 is controlled by connecting rods 441, 442. This is actuated by brake pedal 66 pivoted at 67 to the frame and held yieldingly in initial position by spring 68 acting on rockshaft arm 69 (see Fig. 3A).

A cut-out switch 70 is provided in the circuit 51 so that when the switch is applied, the operator by merely opening this switch can lock the same in position and it will be impossible to operate the switch until the cut-out switch is again closed.

The operation of my improved brake will be very readily understood from a consideration particularly of Figs. 1–3 and 4. When pressure is applied to the brake pedal 66 it results in a pull on the actuating rod 441 which pulls the slide 44 to the left of that figure. This causes the brake rocker 59 to contact with the roller 65 and depresses the contact 611 down into engagement with the contact 52 which, through binding post 53 and conductor 54 delivers current to the motor 17. This sets the worm 20 in operation, driving the worm gear 21, which, through pinion 34, drives the gear 35, operating shaft 36 with the pinion 38, causing the rack 39 to move toward the left of Fig. 3. As soon as the travel of the slide 44 ceases, the roller 65 is carried by rack 39 to the central part of the notch 491, permitting the switch to open and the motor to stop. This applies the brake to the extent that the pedal is depressed. If the pressure is relieved on the pedal 66, the spring 68 causes the slide to return, the left hand side of the notch 591 comes into engagement with the roller 65, causing the contact 621 to close onto the contact 55, delivering current to the electromagnetic clutch and opens the clutch and allows the brake to return under the action of the brake spring to the initial position. The lever spring 68 causes the follow-up of the slide to accomplish this result. If it is desired to release the brake only partially, the pedal is allowed to move a corresponding amount.

It is thus seen that this brake is under complete control by the mere manipulation of the brake pedal. The brake is applied to the extent that the pedal is depressed and is relieved correspondingly by the control of the pedal on the return of the brake. Thus, although the brake is an electric brake, it is as completely and fully under the control of the operating pedal as though the power were applied directly. This is the service brake. Of course, any car provided with this brake would, under the laws of most States, be required to have an independent emergency brake, which can be of any form desired or required.

The unit 6 is controlled directly by the pedal 66 as in my former patent. The unit 9 is controlled by the arm 71 carried on the spindle 79 of the position controlled motor 73. The position controlled motor comprises the frame made up of side members, also constituting pole members 74, 74 between which is supported the core 75 bearing the field coil 76. Supported on end plates 77, 77 is the armature core 78 carried on spindle 79 in suitable bearings 80, 80 carried by the said plates 77. The multiple cable 81 connects to the series of armature coils. The armature 78 is provided with sixteen longitudinal grooves 82 on its periphery in which are disposed eight pairs of armature coils 83 with independent battery connection 831 and are connected in series to the field coil 76 through conductor 761 to battery 511 grounded at 86, through multiple switch 84 with which cooperates the movable contact member 85 carried by the rockshaft arm 69. The relation of a single pair of field coils 83 is seen in Fig. 11, showing how the field, when electrified, acts upon the armature and the coils in that relation.

Two pairs of coils in their succeeding relations are indicated in Fig. 12 and the whole series of coils 83 is indicated in the end view in Fig. 8.

It will thus be seen that when the pedal 66 is depressed, the contact 85 will be advanced over the multiple switch 84 exciting the coils 83 of the position controlled motor successively and actuating the arm 71 in synchrony with the arm 69, and, through its connection controlling the electric brake unit 9 in parallel with the electric brake unit 6.

It will thus be seen that the operator of the truck, when he steps on the brake pedal, will control not only the brake on the truck, but in exactly parallel relation the brake on the trailer. This control, while it is especially applicable to the precise electric unit here shown which is the same as that appearing in my former patent, is equally applicable to a similar unit and I show an improved form of the unit in Fig. 13. In these units the parts are the same, including the mechanism up to the driven shaft 36 where, in place of the pinion 38 an arm 87 is secured and disposed on the outside of the case. To this rockshaft arm 87 the brake bar 7 is directly attached by a pivot 88.

In place of the switch structure of my former application, there will be an oscillating member 89 pivoted at 90 to the frame 4. This oscillating member carries double contacts 91, 92 with connections 93 from contact 311 to the clutch release and 94 from 92 to the motor. Pivoted on the same pivot 90 is the lever or rocker arm 95 with a contact member 96 connected by connection 97 to the battery. The arm 95 is connected by rod 441 to the arm 69 when it will be observed that when pedal 66 is operated and pushed down through the connections it will swing the switch arm 95 forwardly, closing the circuit from the battery through connection 94 to the motor, operating the same, thereby actuating the arm 87 and through its pivot 88 operating the brake. The swinging switch member 89 is connected by link 98 to arm 99 on the brake connection 7 so that when the brake arm 87 swings forwardly, it will separate switch member 92 from the contact 96, cutting off the motor and stopping the brake at any predetermined point to which the operating pedal is depressed.

When the pedal is released or allowed to rise, the spring 68 and the brake spring mechanism as well cause the reverse movement. The arm 95 is swung toward the rear, contact point 96 contacts with point 91, delivers current through the circuit 93 and releases the magnetic clutch and permits the release of the brake until the contact is broken by the movement of the rod 7 which permits the clutch to again close and holds the brake definitely at the point to which it may be released. Thus definitely the brake is controlled precisely by the movement of the control lever 95.

In this same mechanism, I provide my position controlled motor 73 which operates its arm 71 controlling its rod 441 and operating the arm 951 of a control mechanism on the trailer which is precisely identical with the control mechanism just described as located on the frame of the truck, operating a precisely identical motor on the truck, indicated diagrammatically in Fig. 13.

From this it will be seen that when an operator, operating this brake mechanism on a truck and trailer, depresses foot pedal 66, he will operate directly by the connections the electric brake mechanism on the truck and at the same time, through the multiple switch with which the movable member 85 on the arm 68 cooperates, controls successively the coils 83 in the position controlled motor 73 and controls the electric brake mechanism on the trailer in synchrony with the mechanism on the truck.

Having thus described my invention, what I claim as new and desire to secure by Letters Patent is:

1. In an electric brake mechanism for controlling the brakes of a truck and trailer, the combination of identical brake actuating and control electric units, one on the frame of the truck and the other on the frame of the trailer, a brake pedal, an arm actuated thereby connected to control the brake on the said truck, a position controlled electric motor carried on the frame of the said trailer comprising a field coil and field magnet, an armature with a plurality of pairs of coils in series with said field magnet coil adapted to cooperate with the said field coil and field magnet, a multiple switch associated with the brake pedal, a contact member on the brake pedal to cooperate with the said multiple switch and actuate the series of coils successively to control the position of the armature of said position controlled motor, and an arm on the said armature of said motor with connections to the switch of the electric brake control of the brake on the said trailer, whereby on the actuation of the brake pedal on the said truck, the brakes on the truck and trailer will be simultaneously controlled.

2. In an electric brake mechanism for controlling the brakes of a trailer for a truck, the combination of a brake actuating and control electric unit on the frame of the trailer, a brake pedal on the truck, a position controlled electric motor carried on the frame of the said trailer comprising a field coil and field magnet, an armature with a plurality of pairs of coils in series with said field magnet coil adapted to cooperate with the said field coil and field magnet, a multiple switch associated with the brake pedal, a contact member on the brake pedal to cooperate with the said multiple switch and actuate the series of coils successively to control the position of the armature of said position controlled motor, and an arm on the said armature of said motor with connections to the switch of the electric brake control of the brake on the said trailer, whereby on the actuation of the brake pedal on the said truck, the brake on the trailer will be controlled.

3. In an electric brake mechanism for controlling the brakes of a truck and trailer, the combination of identical brake actuating and control electric units, one on the frame of the truck and the other on the frame of the trailer, a brake pedal, an arm actuated thereby connected to control the brake on the said truck, a position controlled electric motor carried on the frame of the said trailer, a switch associated with the brake pedal, a contact member on the brake pedal to cooperate with the said switch of said position controlled motor, and an arm on the said armature of said motor with connections to the switch of the electric brake control of the brake on the said trailer, whereby on the actuation of the brake pedal on the said truck, the brake on the truck and trailer will be simultaneously controlled.

4. The combination of a brake, an electric brake actuating and control electric unit, a lever having connections for controlling the motor relative to the depression of the said lever, a position controlled electric motor comprising a field magnet, an armature with a plurality of pairs of coils in series with said field magnet coil adapted to cooperate with said field magnet, a multiple switch, a brake pedal associated with said switch, a contact member on the brake pedal to cooperate with said multiple switch and actuate the series of coils successively to control the position of the armature of said position controlled motor, and an arm controlled by said armature having connections to the switch of the electric brake control, whereby on the actuation of the brake pedal the position controlled motor is operated to control the brake.

5. In an electric brake structure having a brake pedal, the combination of a housing, an electric motor having a worm shaft, a second shaft, a worm gear thereon and cooperating with said worm shaft, a pinion carried on said second shaft, a rockshaft, an arm thereon, a connection from said arm to the brake, a train of gears from the said pinion to actuate said rockshaft, a spring pressed disk clutch connection located between the said motor and the said rockshaft, an electromagnet for releasing the same, a switch having a pivoted member having double contacts, a connection from one contact to the motor and a connection from the other contact to the clutch magnet, a switch arm having a contact having a battery connection adapted to move between the contacts on said movable member, connections to the brake pedal for the said switch arm, whereby on depression it actuates the motor and on release it actuates the clutch, a connection from the movable switch member to the brake actuating means, whereby on the actuation of the brake the contact is broken to hold the brake at any desired point of depression and also to break the magnet connection to release at any desired point when the brake is being released.

6. In an electric brake structure, the combination of a suitable housing, an electric motor connected to apply the brake, an electromagnetic clutch having an electric release for connecting said motor to the brake, a switch having a pivoted member having double contacts, a connection from one contact to the motor and a connection from the other contact to the electric release of the clutch, a switch arm having a battery contact having a pivotal connection adapted to move between the contacts on said movable member, and a connection from the movable member of said switch to a moving part of the brake mechanism, whereby on the operation of the said switch lever to actuate the motor the movement of the brake will cut off the current at any desired point of depression and when the lever is operated to release the brake the movement of the brake will open the circuit to the electric release to control the brake at any desired point.

7. In an electric brake mechanism having a brake control lever, the combination of a brake actuating and control electric unit, a position controlled electric motor comprising a field coil and field magnet, an armature with a plurality of pairs of coils in series with said field magnet coil adapted to cooperate with the said field coil and field magnet, a multiple switch associated with the brake control lever, a contact member associated with the control lever to cooperate with the said multiple switch and actuate the series of coils successively to control the position of the armature of said position controlled motor as the brake control lever is moved, a brake having an electric control and a switch therefor and an arm on the said armature of said motor with connections to the switch of the electric brake control of the brake, whereby on the actuation of the control lever the brake will be operated.

8. In an electric brake mechanism having a control lever, the combination of a brake actuating and control electric unit, a position controlled electric motor comprising a field coil and field magnet, an armature with a plurality of pairs of coils in series with said field magnet coil adapted to cooperate with the said field coil and field magnet, a multiple switch associated with the brake control lever, a contact member associated with the control lever to cooperate with the said multiple switch and actuate the series of coils successively to control the position of the armature of said position controlled motor, and an arm on the said armature of said motor as the control lever is moved to control said brake control unit.

9. In an electric brake structure having a brake having a moving part that moves when the brake is applied and released, the combination of a suitable housing, an electric motor connected to apply the brake, an electromagnet clutch having an electric release for connecting said motor to the brake, a switch having a movable member having double contacts, a connection from one contact to the motor and a connection from the other contact to the electric release of the clutch, a switch lever having a battery contact having a connection adapted to move between the contacts on said movable member, a connection from the movable member of said switch to said moving part of the brake mechanism, whereby on the operation of the said switch lever to actuate the motor the movement of the moving part of the brake will cut off the current at any desired point of depression and when the lever is operated to release the brake the movement of the moving part of the brake will open the circuit to the electric release to control the brake at any desired point, and a position controlled motor connected to control said switch lever.

ROYAL E. ADAMS.